(12) United States Patent
Kalevo et al.

(10) Patent No.: US 8,717,403 B1
(45) Date of Patent: May 6, 2014

(54) COMMUNICATIONS USING AT LEAST TWO DIFFERENT MEDIA TYPES

(71) Applicant: Gurulogic Microsystems Oy, Turku (FI)

(72) Inventors: Ossi Kalevo, Toijala (FI); Tuomas Kärkkäinen, Turku (FI); Valtteri Hakkarainen, Turku (FI); Heikki Salmela, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 13/948,552

(22) Filed: Jul. 23, 2013

(30) Foreign Application Priority Data

Apr. 23, 2013 (EP) .................................... 13164918

(51) Int. Cl.
*H04N 7/15* (2006.01)

(52) U.S. Cl.
CPC ..................................... *H04N 7/15* (2013.01)
USPC ................... 348/14.02; 348/14.09; 348/14.12

(58) Field of Classification Search
CPC ......... H04N 7/15; H04N 7/142; H04N 7/147; H04N 7/152
USPC .................... 348/14.01–14.16; 370/260–261; 715/753; 709/204
See application file for complete search history.

(56) References Cited

U.S. PATENT DOCUMENTS

| | | | |
|---|---|---|---|
| 2007/0132845 A1* | 6/2007 | Gottesman | 348/143 |
| 2007/0153091 A1* | 7/2007 | Watlington et al. | 348/208.14 |
| 2008/0136895 A1* | 6/2008 | Mareachen | 348/14.03 |
| 2012/0082226 A1* | 4/2012 | Weber | 375/240.12 |
| 2012/0154509 A1* | 6/2012 | Erb | 348/14.03 |
| 2012/0308044 A1* | 12/2012 | Vander Mey et al. | 381/104 |
| 2013/0002800 A1* | 1/2013 | Mock | 348/14.03 |
| 2013/0007635 A1* | 1/2013 | Michaelis et al. | 715/753 |
| 2013/0155177 A1* | 6/2013 | Mock | 348/14.08 |

FOREIGN PATENT DOCUMENTS

| | | |
|---|---|---|
| EP | 2 490 424 A1 | 8/2012 |
| EP | 2490424 A1 * | 8/2012 |
| WO | WO 2012/166811 A3 | 12/2012 |

OTHER PUBLICATIONS

Search Report pursuant to Rule 62 EPC, the European search report (R. 61 EPC) 19, Sep. 2013 13164918.8 (7 Pages).

* cited by examiner

*Primary Examiner* — Melur Ramakrishnaiah
(74) *Attorney, Agent, or Firm* — Robert P. Michal; Lucas & Mercanti LLP

(57) ABSTRACT

To avoid unnecessary release and re-establishment of a connection the connection is maintained but two or more media streams relating to a communication over the connection are blocked from the apparatus and/or to the apparatus in response to receiving information indicating that the two or more media streams relating to the communication are to be blocked.

21 Claims, 14 Drawing Sheets

COMMUNICATIONS USING AT LEAST TWO DIFFERENT MEDIA TYPES

CROSS REFERENCE TO RELATED APPLICATIONS

This application claims the benefit under 35 USC 119(a) and 37 CFR 1.55 to European Patent Application No. EP 13164918.8 filed on Apr. 23, 2013, the entire disclosure of which is incorporated herein by reference.

TECHNICAL FIELD

The present invention relates to communication using at least two different media types.

BACKGROUND INFORMATION

The evolvement of communication technology, particularly IP based (IP, Internet Protocol) communication technology and end user devices, has enabled versatile communication possibilities and introduction of different services, like web conferencing, exchanging multimedia that integrates two or more different medias, etc. Web conferencing refers to a service that allows conferencing events to be shared with remote locations. The service allows real-time point-to-point communications as well as multicast communications from one sender to many receivers. It offers information to be shared simultaneously by means of text-based messages, voice and video chat, for example, across geographically dispersed locations.

Sometimes there may be unwelcomed interruptions or disturbances in the middle of a communications. One example of such situations is that while a person is having a video conference call in a room, an assistant enters the room needing immediate signature for a secret paper and some instructions. In such a situation a quick and simple way to block the video conference call would be advantageous. However, the only quick way to ensure that nothing will be seen or heard from the room by other participants of the video conference call, is to end the video conference call. The problem with the solution is that it takes some time to establish the video conference call again.

SUMMARY

A general aspect of the invention is to provide a mechanism that provides a quick and simple mechanism to solve the above problem.

The invention is defined in methods, and apparatus, a computer program product and a system.

An aspect of the invention provides a tool, called herein a digital curtain, for at least partly blocking at least sending or receiving user data over a connection without ending the connection, i.e. without blocking sending and receiving control data. Advantages of the aspect include saving time and avoiding unnecessary release and re-establishment of a connection, thereby saving also network resources.

BRIEF DESCRIPTION OF THE DRAWINGS

In the following different embodiments will be described in greater detail with reference to the attached drawings, in which.

DETAILED DESCRIPTION

The following embodiments are exemplary. Although the specification may refer to "an", "one", or "some" embodiment(s) in several locations, this does not necessarily mean that each such reference is related to the same embodiment(s), or that the feature only applies to a single embodiment. Single features of different embodiments may also be combined to provide other embodiments.

Embodiments of present invention are applicable to any apparatus supporting use of at least two different media types in a communication over one or more networks or corresponding communication system(s). The communication may be over a wireless net system or a network/communication system utilizing both fixed connections/networks and wireless connections/networks. The communication may be of any type, such as multicast, unicast, multi-unicast, uni-multicast and broadcast, regardless of whether the communication is a real-time communication or a playback communication or a combination thereof. Further, the communication may be full-duplex, half-duplex or simplex. The communication can also be as point-to-point communication or point-to-multipoint communication or multipoint-to-multipoint communication or multipoint-to-point communication and it can use server for centralized system or it can use decentralized system (e.g. peer-to-peer network). The protocols used and the specifications of communication, especially in wireless communication, develop rapidly. Such development may require extra changes to an embodiment. Therefore, all words and expressions should be interpreted broadly and are intended to illustrate, not to restrict, the embodiment.

Figure 1A:
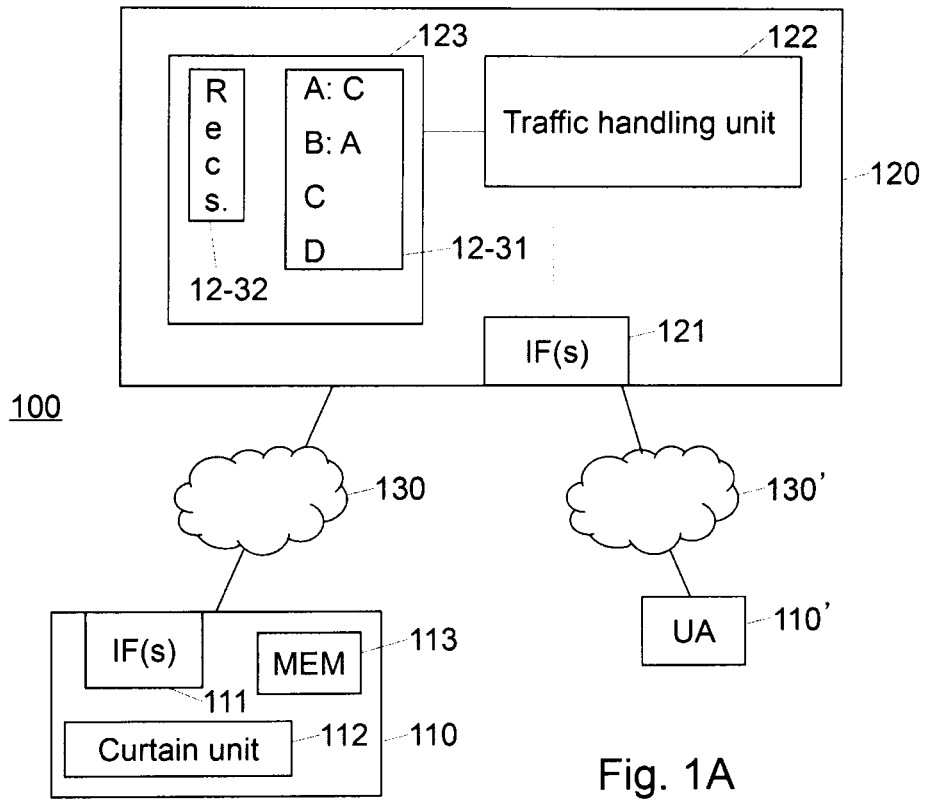
FIGS. 1A, 1B and 1C are simplified architectures of exemplary systems having schematic block diagrams of exemplary apparatuses.

A general architecture of a system 100 according to an exemplary embodiment is illustrated in FIG. 1A. FIG. 1A is a highly simplified system architecture only showing some elements and functional entities, all being logical units whose implementation may differ from what is shown. The connections shown in FIG. 1A are examples of logical connections; the actual physical connections may be different. It is apparent to a person skilled in the art that the systems also comprise other functions, structures and apparatuses. It should be appreciated that the functions, structures, elements and the protocols used in or for establishing a connection and transmitting different media formats over the connection, and the amount of actual channels needed for the connection are irrelevant to the actual invention. Therefore, they need not to be discussed in more detail here.

The exemplary system 100 illustrated in FIG. 1A comprises one or more user apparatuses 110, 110' (only two shown in FIG. 1A), connected to a server apparatus (or to a server system) 120 via which server apparatus a communication service is provided. For example, the communication service may be a Starwindow service provided by the assignee of the application in which case a user apparatus may be a dedicated user apparatus for the Starwindow service or having an app/application/widget providing the Starwindow service. The connection(s) between the server apparatus 120 and a user apparatus 110, 110' may be over one or more networks 130, such as a mobile network, a public switched telephone network, a wide area network WAN, Internet, a local area network LAN open for all users or with restricted access (an enterprise LAN or office LAN, for example), Wireless LAN, like Wi-Fi, a private network, a proprietary network or any combination thereof. However, as said above, the type(s) and system(s) on which the network is based, bears no significance, and any type of a network/connection over which user data can be transmitted, can be used.

In FIG. 1A, only some units for the user apparatus 110, 110' are illustrated with only one of the user apparatuses (110). The user apparatus 110, 110' may be any kind of a computing apparatus that can act as an end point for a communication and supports communications using at least two different media types, and it may be referred to as a user terminal or user equipment or a user device. Examples of such user apparatuses include portable wireless mobile communication devices operating with or without a subscriber identification module (SIM) in hardware or in software, including, but not limited to, the following types of devices: a mobile phone, a smart phone, a personal digital assistant (PDA), a handset, a laptop computer, an e-reading device, a tablet, a mobile device dedicated for the service. Further, it should be appreciated that any kind of operating system may be used. Examples of such operating systems include Android, Windows, and iOS. In addition, any application, based on any programming language, including operation system independent languages, may be supported, such as Java, HTML (HyperText Markup Language), HTML5, and QT (a cross-platfrom application framework) based applications. In the illustrated example, at least one of the user apparatuses (110) comprises a curtain unit 112 for blocking at least partly and unblocking sending and/or receiving user data over a connection without ending the connection, as will be described in more detail below. The user data typically comprises two or more different media streams originating from a source, like audio and video from one participant in a video conference call. The user apparatus 110 comprises also one or more different interface units 111 for communications, such as one or more antennas for sending and receiving different media types and different user interface units, such as one or more screens (remote or integrated), one or more speakers (remote or integrated), one or more cameras (remote or integrated), a touch screen, a switch, a keyboard, a virtual keyboard, a mouse, a joystick, a selector roller, a choice wheeler, a selector switch, a drawing pad, a touch pad, etc. However, they are not illustrated in detail here. The user apparatus 110 comprises also memory 113 that may be used for storing information whether or not a digital curtain is closed or open, as will be described in more detail below. Further, the user apparatus comprises a processor (not shown in FIG. 1A) configured to implement at least one of the described curtain unit related functionality and the memory 113, or another memory, is configured to store a program code required at least for the curtain unit.

In FIG. 1A, only some units for server apparatus 120 are illustrated. The server apparatus 120 may be any kind of a computing apparatus that supports use of at least two different media stream types and can act as an intermediate participating point for a communication or a conferencing communication, and it may be referred to as a server or a server system. In other words, the server apparatus 120 may be any general purpose apparatus (device) programmable or otherwise configurable to carry out dedicated resource sharing to one or more clients. For example, the server apparatus 120 may be a computer or other computing component, like a conferencing server or a media server, configured to process different media streams associated with communications. In the illustrated example, the server apparatus 120 comprises a traffic handling unit 122 for media streams of the communication. Further, the server apparatus 120 comprises a memory 123 that may be used for maintaining information on contacts in one communication, and information relating whether or not they are blocked (completely or partly), for example. In the example, the memory comprises a participant list with blocked information for one multimedia communication 12-31, the participants being listed and blocked participants being indicated after a colon after a participant's identifier. In the example, the memory 123 comprises also stored/recorded media streams 12-32 relating to communications. One may say that the participants share a playback capable virtual room in the server. The example relates to a situation described below with FIG. 2C. Further, the server apparatus comprises a processor (not shown in FIG. 1A) configured to implement at least one of the described traffic handling unit related functionality and the memory 123, or another memory, is configured to store a program code required at least for the traffic handling unit. It should be appreciated that the system may be implemented without storing media streams.

Figure 1B:
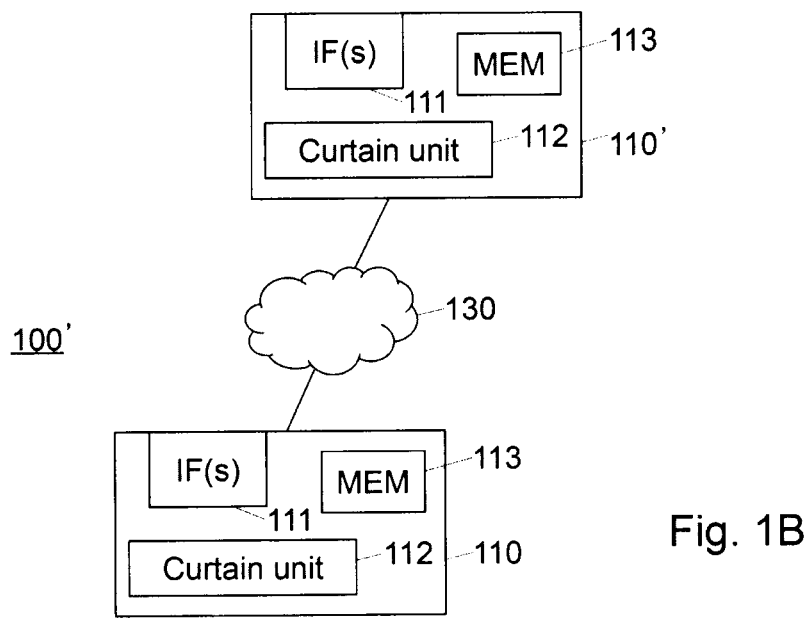

The exemplary system 100' illustrated in FIG. 1B comprises one or more user apparatuses 110, 110' (only two shown in FIG. 1B), configured to provide the curtain functionality without a server involvement. In other words, at least one of the user apparatuses 110, 110' corresponds to a user apparatus described above, i.e. comprises the interfaces 111, the curtain unit 112, and the memory 113, the curtain unit 112 being configured to perform functions without the server apparatus involvement and without interaction with the server.

Figure 1C:
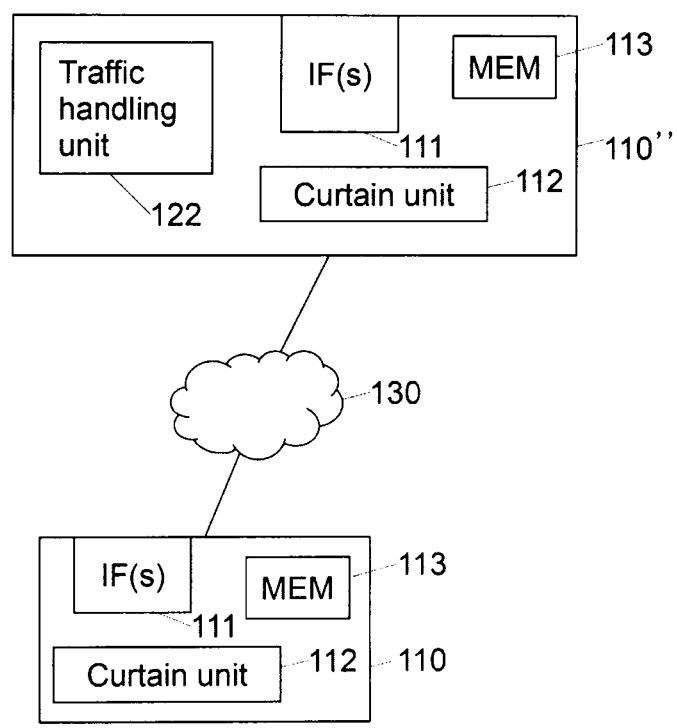

In a further exemplary system, illustrated in FIG. 1C that is based on the same idea as the exemplary system in FIG. 1B (i.e. no separate server apparatus), at least one of the user apparatuses 110" is configured to comprise also the traffic handling unit 122, i.e. act as a server, so that during the communications the user apparatus may act as a server apparatus, and depending on an implementation, to store the media streams to an external memory (not shown in FIG. 1C), for example, or not to store the media streams at all.

FIGS. 2A to 2G illustrate different examples of what is shown in one participants screen 200 when a videoconference is going on. In the illustrated examples it is assumed, that when a media stream is blocked, it is wholly blocked without restricting the embodiments to such a solution. A curtain may block a media stream only partly, as will be described below. In the illustrated examples of FIGS. 2A to 2C it is assumed that two types of digital curtains are in use, one type 201 being for the whole video conference, called below a common curtain, the other 202 being for a contact-specific video conference, called below a contact-specific curtain.

Figure 2A:
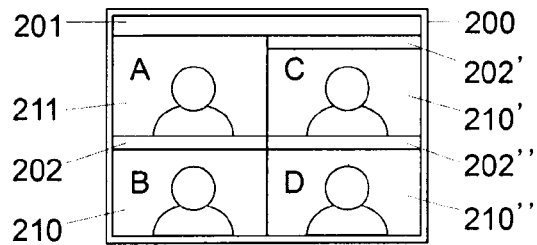
FIGS. 2A, 2B, 2C, 2D, 2E, 2F, and 2G are simplified block diagrams illustrating different examples.

FIG. 2A illustrates a situation in which four participants A, B, C, D of a video conference call are seeing and hearing each other, as is shown in the screen 200 of participant A. The screen is divided into four parts, parts 210, 210', 210" for other participants B, C, D having contact-specific digital curtain 202, 202', 202" in an open position, and a part 211 for the participant A is shown having no curtain. Further, in the upper portion of the screen there is the common curtain 201 in an open position. In the open position, each curtain shows only a closing area. When the participant A touches the closing area the curtain will be closed, and corresponding communication will be blocked.

Figure 2B:
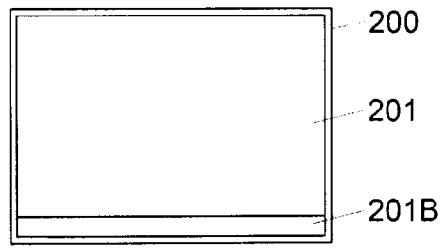

FIG. 2B illustrates a situation in which the participant A has been interrupted, for example, and he/she has closed the common digital curtain 201. The common curtain 201 hides the screen 200 and blocks video and audio, the bottom portion of the common curtain comprising an opening area 201B in the closed position of the digital curtain. When the participant A touches the opening area the curtain will be opened and corresponding communication will be unblocked.

Figure 2C:
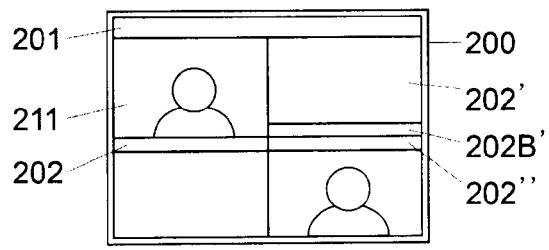

FIG. 2C illustrates a situation in which one of the other participants, the participant B has closed his/her curtain and the participant A do not receive anything from the participant B. However, since the participant A has not closed the curtain for the participant B, it has the closing area 202 in the upper part so that the participant A is able to close the curtain in his/her part if he/she wants to close it. For example, if the participant A wants to share something with the participants C and D but not with participant B, by closing the curtain for the participant B he/she is not dependent on the behavior of the participant B. However, in the illustrated example it is only the participant C with whom the participant A does not want to share some details, and therefore he/she has closed the curtain only for the participant C. Therefore corresponding part is hidden by means of the curtain 202', the part having at the bottom portion an opening area 202B for a corresponding closed curtain. Currently, the part for the participant A and the part of the participant D are shown, the latter having the digital curtain 202 in an open position. Further, in the upper portion of the screen 200 the other type of digital curtain 201 is in an open position.

Figure 2D:
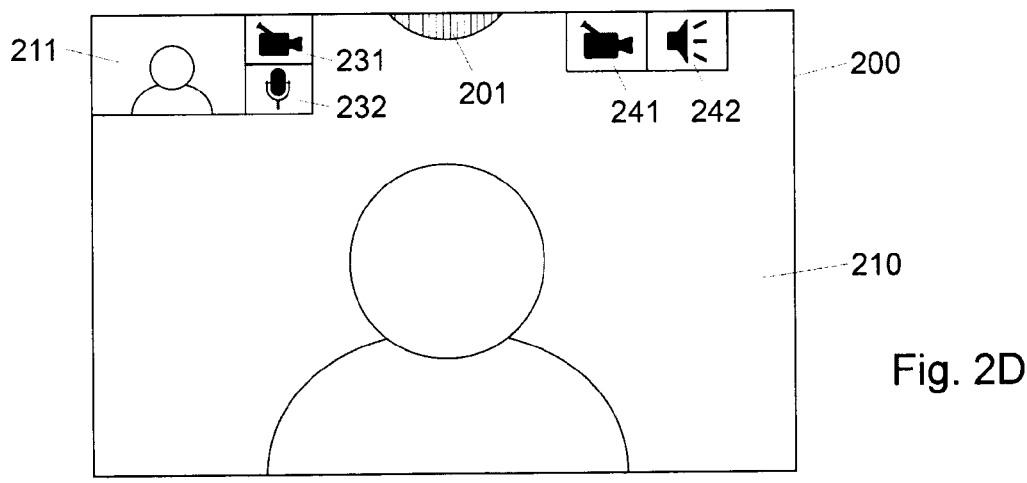

FIG. 2D illustrates a situation in which two participants are having a video call, or are the only participants of a video conference call. In the illustrated example, the screen of participant A shows participant A in an upper corner 211, the common curtain 201 in open position. Further, there is provided separate disable/enable buttons 231, 232, 241, 242, a set for media streams from the participant A's user apparatus, and a set for media streams to the participant A's user apparatus, each button for disabling enabling related media stream type. In the illustrated example there is a camera button 231 (for what is to be shown to participant B), and a microphone button 232 (for what audio is to be sent to participant B), a display button 241 (for what is to be shown to participant A), and a loudspeaker button 242 (for what audio is to be played to participant A). Depending on an implementation, the display button and the audio button may be common or contact-specific. By touching the common curtain, (or its closing area) 201, the participant A can interrupt the video call while still maintaining the call, and by touching one of the buttons, the participant A can block sending or receiving a corresponding media types while sending and receiving the other media types continues.

A contact-specific button has the advantage that only one audio or video source may be blocked, while the others can be still heard and seen. In prior art solutions, if the user does not want to hear or see something, he/she has to turn volume of incoming audio to zero, and/or switch off a screen but that results to all audio and/or all video being blocked.

Figure 2E:
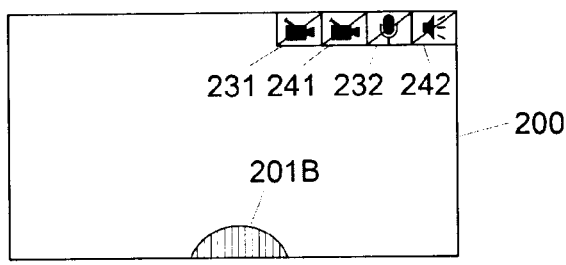

FIG. 2E illustrates the same call/conference as is illustrated in FIG. 2D, but in a situation in which the participant A has closed the curtain, and thus all sending and receiving is blocked. Therefore the screen shows the opening area 201B for the curtain, and each button 231, 232, 241, 242 as disabled. The participant A can then either open the curtain by touching the opening area 201B, or enable one or more of the camera, microphone, loudspeakers and display by touching the corresponding button.

Figure 2F:
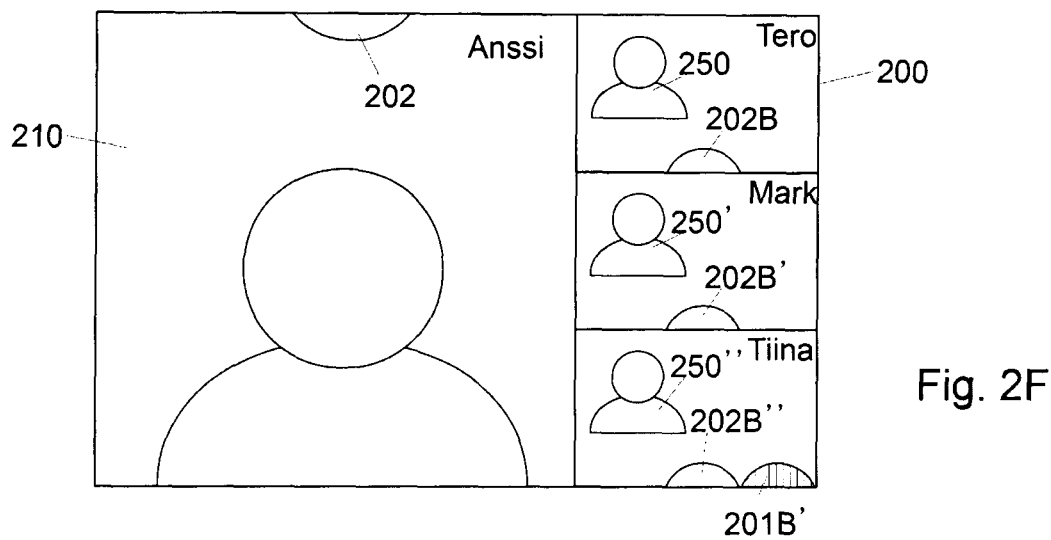

FIG. 2F illustrates a situation in which five participants Anna, Anssi, Tero, Mark and Tiina are having a video conference call but Anna, whose screen 200 is illustrated in FIG. 2F, is changing some private information with Anssi. Therefore the curtains for Tero, Mark and Tiina are enclosed the curtains comprising a corresponding contact-specific opening area 202B, 202B', 202B", whereas the curtain 202 of Anssi is open, in the illustrated example, the curtain unit is configured to provide a common opening area 201B' whenever two or more contact-specific curtains are dosed, and a common closing area whenever two or more contact-specific curtains are open. In the example the common curtain is a tool opening or closing two or more contact-specific curtains at a time. In the illustrated example only one contact-specific curtain is open, so no common closing area is illustrated. Anna may open the curtains for Tero, Mark and Tiina at the same time by touching the common opening area 201B', or the curtains may be opened curtain by curtain by touching corresponding opening area(s) 202B, 202B', 202B".

Further, in the example of FIG. 2F, unlike in the above examples, where the closed curtain is not showing anything, or at most an identifier, each closed curtain comprises an image 250, 250', 250" of the corresponding participant. The image may be the last image information received before the curtain was dosed, the last image information received without colours, or a picture inserted by a participant him-/herself to the communication service. Having such a curtain will facilitate recognizing who is behind the dosed curtain. However, the functionality may be implemented with a non-illustrative curtain, like a grey screen, or a theatre curtain or curtain in a window.

Figure 2G:
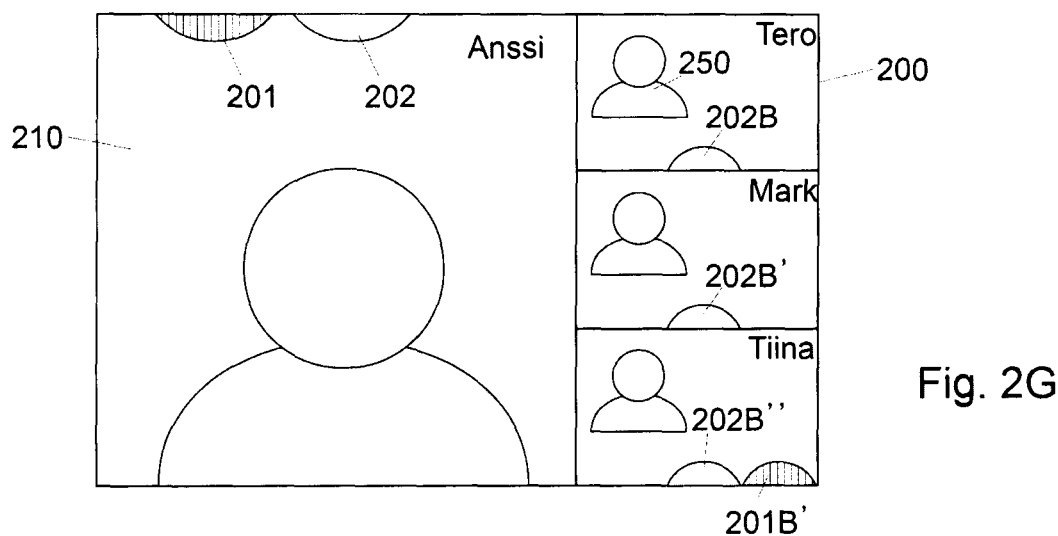

FIG. 2G illustrates a similar situation as is illustrated in FIG. 2F, in which five participants Anna, Anssi, Tero, Mark and Tiina are having a video conference call but Anna, whose screen 200 is illustrated in FIG. 2F, is changing some private information with Anssi. Therefore the curtains for Tero, Mark and Tiina are enclosed the curtains comprising a corresponding contact-specific opening area 202B, 2026', 2026", whereas the curtain 202 of Anssi is open. In the illustrated example Anna is able to see that Tero has dosed his curtain for Anna, since the closed curtain for Tero comprises an image 250, whereas the closed curtains for Mark and Tiina are translucent, and providing "disturbed" outputting of incoming media streams. In other words, in the illustrated example the contact-specific curtains are configured to block sending and blur/hum received media streams, illustrated by dashed line in FIG. 2G in the screen areas for Mark and Tiina. Further, in the illustrated example the common curtain is configured to block both sending and receiving media streams, the common curtain 201 being open in the situation illustrated in FIG. 2G. In the illustrated example, the curtain unit is configured to provide a common opening area 201B' whenever two or more contact-specific curtains are closed. Anna may open the curtains for Tero, Mark and Tiina at the same time by touching the common opening area 201B', or the curtains may be opened curtain by curtain by touching corresponding opening area(s) 202B, 202B', 202B".

An advantage provided by the blurred curtain is that it makes it easier to Anna notice, either by seeing or by hearing, if something interesting or alerting happens in Mark's or Tiina's end, and it is easy for Anna to open the curtain. Further, Anna is aware that Tero has closed a curtain for Anna, and if Tero opens the curtain for Anna before Anna opens the curtain for Tero, Anna will notice it because then instead of the image, blurred/hummed media streams are outputted to Anna.

Instead of blurring/humming, the incoming media streams may be disturbed otherwise. For example, when sending media stream is blocked by the curtain, the curtain unit may be configured to show only half of the window, show it in a half-open blind-manner, and the sound volume may be automatically lowered. For example, there may be provided an opening/closing area with a knob so that the incoming and/or outgoing media streams are either wholly blocked, partially blocked, or unblocked depending where in the opening/closing area the knob locates. The opening/closing area may be implemented so that it provides a step-wise closing/opening or stepless closing/opening and thereby provides corresponding control of disturbance of media streams, from wholly disturbed (wholly blocked) to non-disturbed.

As is evident from the above, there are several ways to provide and implement a digital curtain. For example, the common curtain may be a separate curtain, the closing of which blocks all incoming and outgoing media streams, only the control plane signaling to maintain the connection is transmitted, and opening of the common curtain either opens all contact-specific curtains or restores each contact-specific curtain to a state (opened or closed) the contact-specific curtain had before the common curtain was closed. The common curtain may be configured to provide either opening alternatives or only one of them.

Although in FIGS. 2A to 2G the digital curtain is opened or closed using a specific area in the touch screen, other ways may be used as well. For example, the curtain may be opened/closed by swiping a symbol, like a figure or icon, on the screen with a finger, by giving a specific gesture to a camera, and/or by giving a voice command to a microphone. The same applies also to the buttons in solutions having the "button functionality". Further, especially if the user apparatus is for monitoring purposes or also for monitoring purposes, the curtain may be configured to close and open periodically or at a given times of a day, in response to an external input, like a signal from a motion detection device or intelligent floor connected to the user apparatus. Other examples include a voice detection device, a light detection device, a touch detection device, a smell detection device, an odour detection device, a heat detection device. In a similar way a mobile phone is configured always to avow security calls, the curtain may be configured to be openable in response to an open command from an emergency operations center or from a preconfigured contact. The latter two may be described as authorized sources to open or lock a curtain.

Figure 3A:
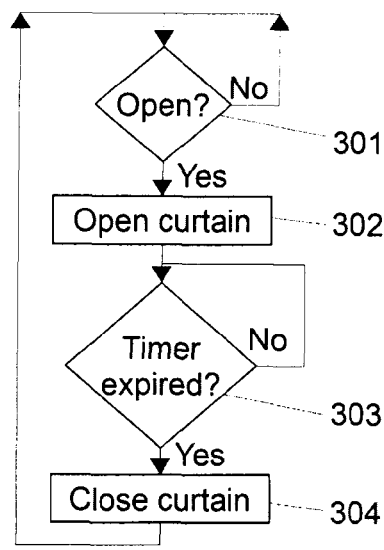
FIGS. 3A, 3B, 4A, 4B, 4C, 4D, 4E, 4F, 5, 6, 7, 8 and 9 are flowcharts illustrating exemplary functionalities.

FIG. 3A illustrates an exemplary functionality of a user apparatus, in which the curtain is configured to close after a certain period of time has lapsed after the curtain was opened. This may be a useful feature especially when the communication service is used for monitoring purposes, for example, to open the curtain in response to a motion detector detecting motion, and thereby succeeding to spotlight the moment. The apparatus may be in a nursing home having a centralized monitoring room, the apparatus being installed near the outdoors and being configured to be responsive to an input sent from a motion detector near the outdoors. Another example is an apparatus installed in an entrance hall of a home and having a connection to an apparatus that may be in a working place, the apparatus in the entrance hall being connected to a motion detector not reacting to movement of pets. This enables a child coming home and to say hello and wave to a parent in a very easy way, and the parent is not disturbed by the pet playing in the entrance hall since the curtain is closed when the child is not in the entrance hall. Further, a burglar entering the entrance hall opens the curtain. Hence, the system also provides an antitheft alarm system.

Referring to FIG. 3A, when a user input indicating to open the curtain is received (step 301), the curtain is opened in step 302 and it is monitored (step 303) until a timer expires. When the time expires (step 303), the curtain is closed in step 304 and the apparatus starts to wait opening the curtain (step 301). The timer may be a separate timer or integrated to a curtain unit.

It should be appreciated that a similar functionality may be used to ensure that a curtain is opened after a predetermined time has lapsed from the time the curtain was closed. For example, if the nursing home is serving also aging persons living still in their home, and an aging person is supposed to open the curtain each time he/she takes his/her medicament, and is avowed to close it in order to have privacy, the opening in response to a certain time has passed increases safety. An example of such a functionality is illustrated in FIG. 3B.

Figure 3B:
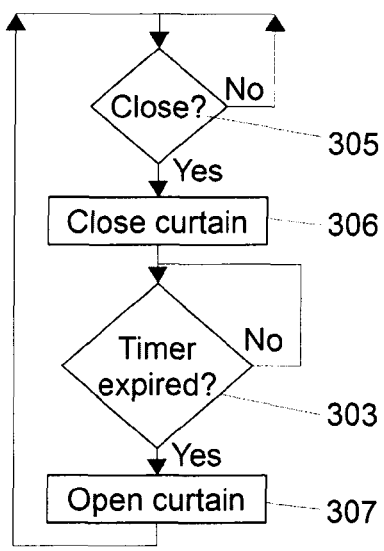

Referring to FIG. 3B, when a user input indicating to close the curtain is received (step 305), the curtain is closed in step 306 and it is monitored (step 303) until a timer expires. When the timer expires (step 303) the curtain is opened in step 307 and the apparatus starts to wait closing the curtain (step 305). The timer may be a separate timer or integrated to a curtain unit.

Instead of a timer or other predetermined time interval, the apparatus may be configured to open/close the curtain at certain times that may be different for each day.

Figure 4A:
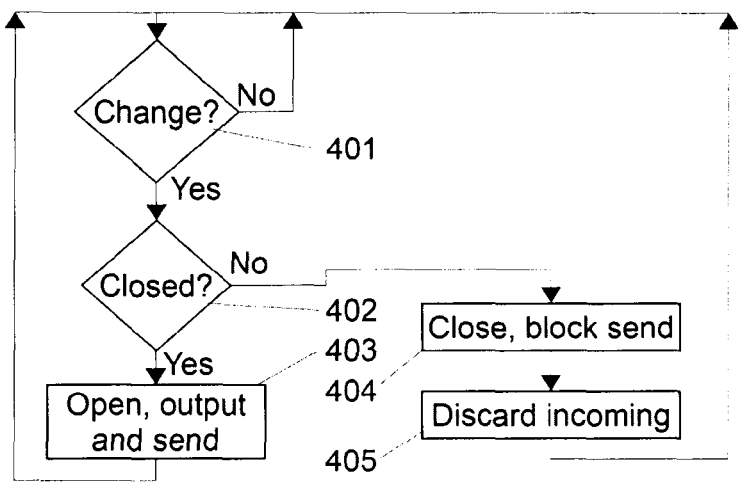
Figure 4B:
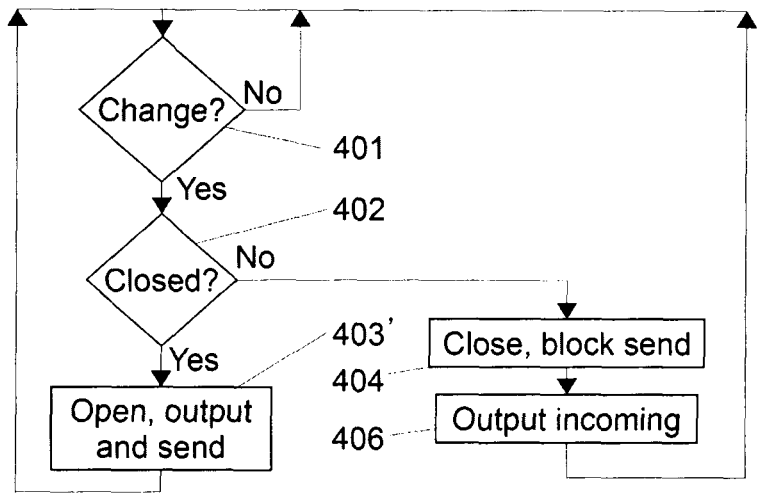
Figure 4C:
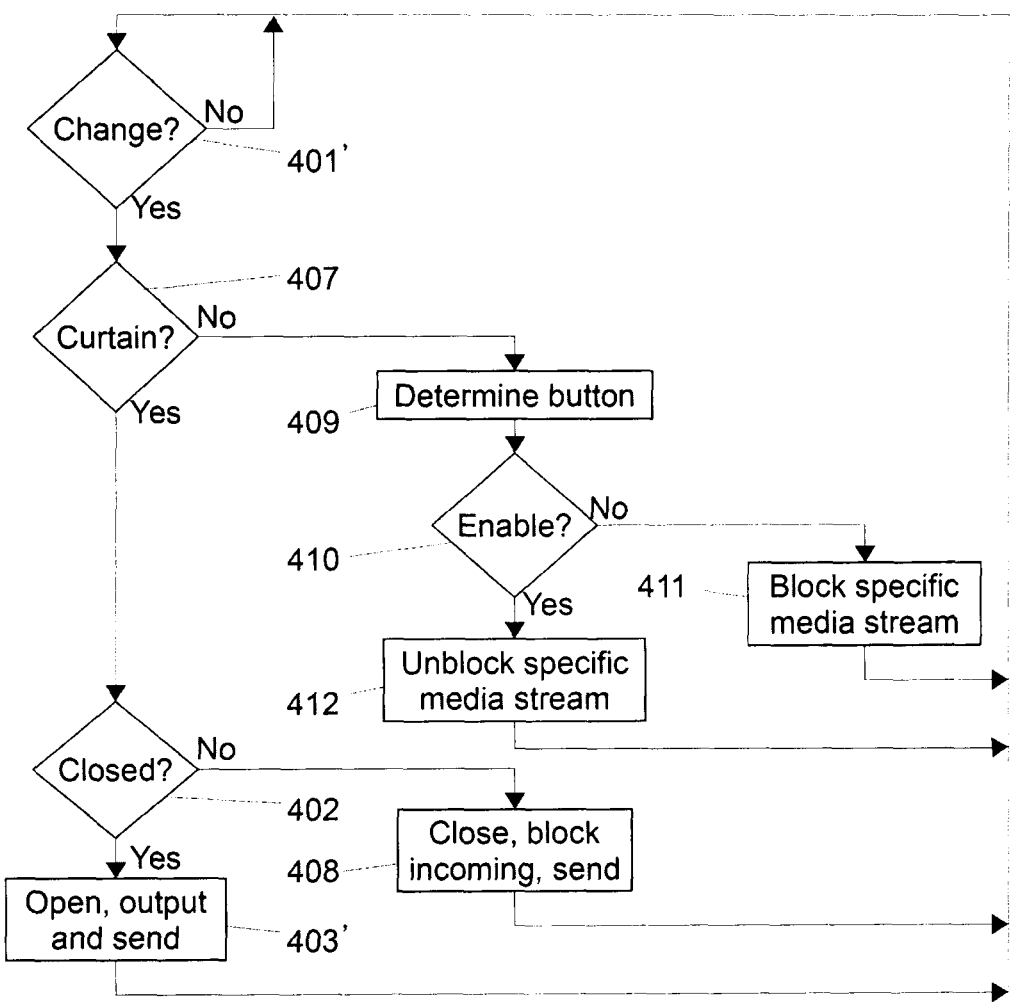
Figure 4D:
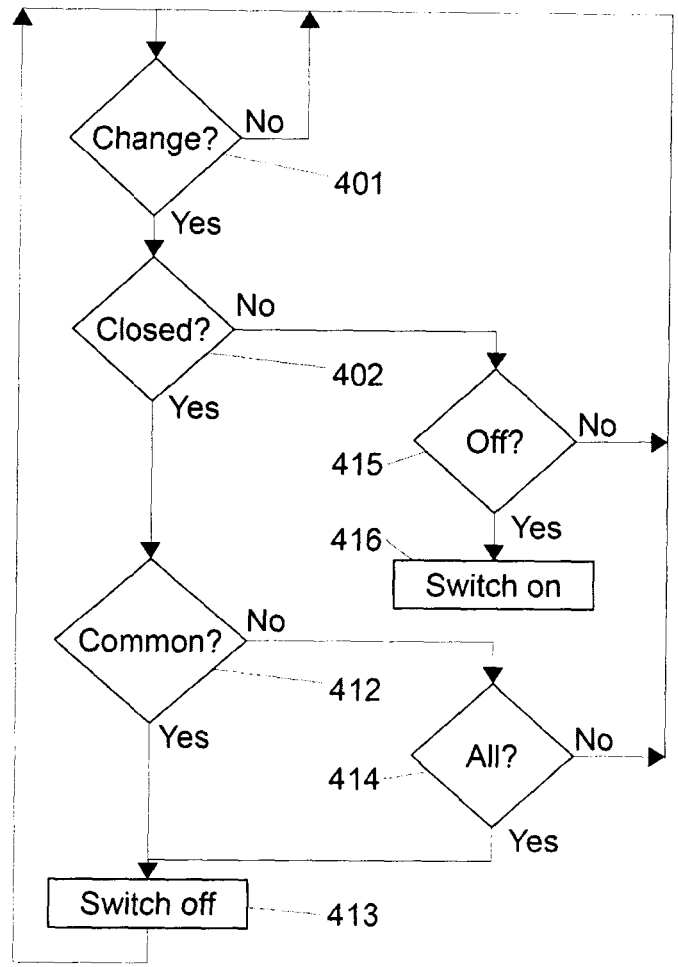
Figure 4E:
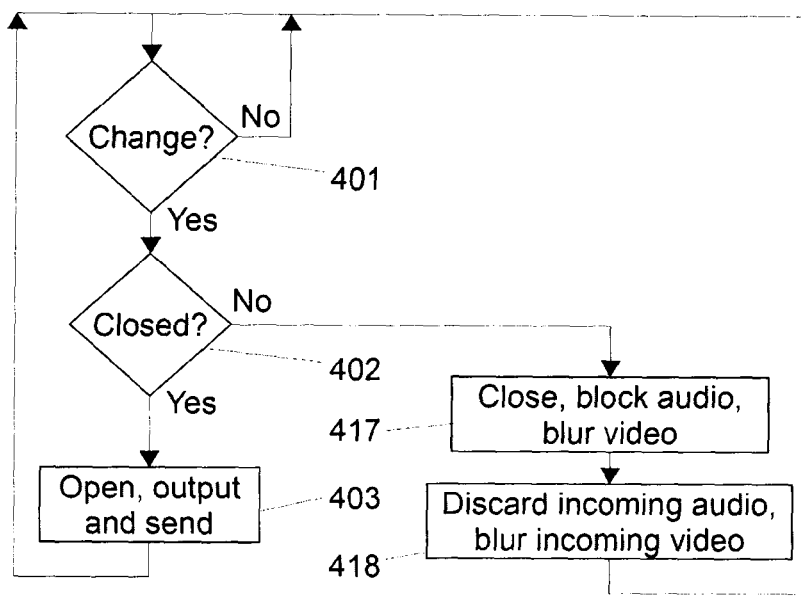
Figure 4F:
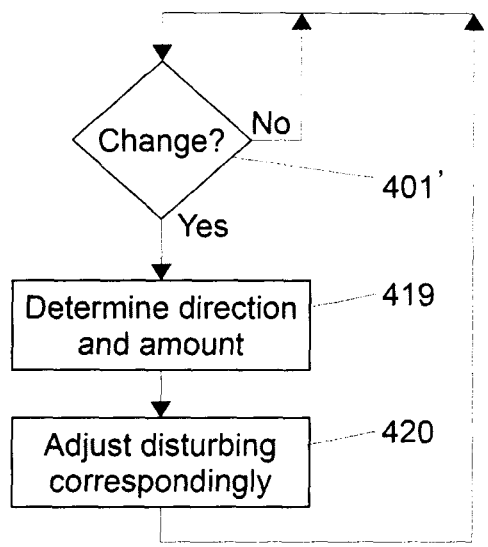

FIGS. 4A to 4F illustrate other exemplary functionalities of the user apparatus. More precisely, FIGS. 4A to 4F illustrate exemplary functionalities of the curtain unit. In the examples it is assumed, for the sake of clarity, that the user apparatus is configured to have only one curtain, the common curtain. In the examples of FIGS. 4A, 4D and 4F, the curtain is for blocking and unblocking incoming and outgoing media streams, whereas in the example of FIG. 4B the curtain is for blocking and unblocking outgoing media streams, and in the example of FIG. 4C the curtain is for blocking incoming media streams. In the examples of FIGS. 4A, 4B and 4C the blocking is performed wholly, in the examples of FIG. 4D the blocking is performed partially to one media stream and wholly to one media stream, and in the example of FIG. 4F the blocking is stepless.

Referring to FIG. 4A, when a change in curtain status is detected (step 401), it is checked in step 402 whether or not the curtain was closed before the change. If yes, the curtain is opened, and all incoming media is outputted in step 403 via corresponding interfaces, like the screen and loudspeakers, and all media received via different user interfaces or in response to a user input (like sharing a document) is sent in step 403 towards the one or more other participants of the communication as long as no change is detected (step 401).

If the curtain was not closed (step 402) before the change, the curtain is closed and media received via different user interfaces or in response to a user input is not sent in step 404 towards the one or more other participants of the communication but discarded, and all incoming media is discarded in step 405 instead of outputting them to the user as long as no change is detected (step 401). The user apparatus may be in an idle state but the connection, like a call, still exist.

Referring to FIG. 4B, when a change in curtain status is detected (step 401), it is checked in step 402 whether or not the curtain was closed before the change. If yes, the curtain is opened, outputting all incoming media is continued in step 403' via corresponding interfaces, like the screen and loudspeakers, and all media received via different user interfaces or in response to a user input (like sharing a document) is sent in step 403 towards the one or more other participants of the communication as long as no change is detected (step 401).

If the curtain was not closed (step 402) before the change, the curtain is closed and media received via different user interfaces or in response to a user input is not sent in step 404 towards the one or more other participants of the communication but discarded, but all incoming media is outputted in step 406 to the user as long as no change is detected (step 401). The user apparatus may be in an idle state but the connection, like a call, still exists.

In the example of FIG. 4C it is assumed that the user is able to enable/disable a specific media stream, such as an audio stream from a specific participant, or to a specific participant, in addition to closing and opening the curtain. In the example it is assumed that the enablement/disablement is performed by means of the buttons described with FIGS. 2D and 2E. Further, in the example it is assumed that a change in a curtain status overrules a controversial enable/disable setting to be in line with the curtain setting without restricting different implementations to such a solution.

Referring to FIG. 4C, when a change in curtain or button status is detected (step 401), it is determined in step 407, whether or not the change relates to the curtain. If the change relates to a curtain, it is checked in step 402 whether or not the curtain was closed before the change. If yes, the curtain is opened, outputting all incoming media is started in step 403' via corresponding interfaces, like the screen and loud-speakers, and sending all media received via different user interfaces or in response to a user input (like sharing a document) is continued in step 403' towards the one or more other participants of the communication. Further, in step 403', all buttons are set to indicate their status as enabled, thereby being usable for disabling. Then the process proceeds to step 401' to monitor whether or not a change is detected.

If the curtain was not closed (step 402) before the change, the curtain is closed and all incoming media is blocked, i.e. discarded in step 408 instead of outputting them to the user but all media received via different user interfaces or in response to a user input (like sharing a document) is sent in step 408 towards the one or more other participants of the communication. Further, in step 408, all buttons relating to other participants are set to indicate their status as disabled, thereby being usable for enabling. However, the status of buttons relating to the user is not changed in step 408. Then the process proceeds to step 401' to monitor whether or not a change is detected.

If the change does not relate to the curtain (step 407), it relates to a button, and in step 409 the button to which the change relates is determined. The button may relate to an audio stream or a video stream of the user or of one participant, for example. After determining the button whose status is changed, it is checked in step 410, whether or not the status change indicate "enable" as a new status.

If the status change does not indicate "enable" as a new status (step 410), the specific media stream relating to the determined button is blocked in step 411. For example, if the button relates to an audio stream from participant B, the specific audio stream, when received, is discarded without outputting it, and then the process proceeds to step 401' to monitor whether or not a change is detected.

If the status change indicates "enable" as a new status (step 410), the to specific media stream relating to the determined button is unblocked in step 412. For example, if the button relates to the audio stream from participant B, the specific audio stream, when received, is outputted, and then the process proceeds to step 401' to monitor whether or not a change is detected.

It should be appreciated that the "button functionality" provided by steps 409-412 may be combined also with a curtain functionality illustrated in FIG. 4A or with the one illustrated in FIG. 4B. Further, it is possible to implement the "button functionality" without other curtain functionality, i.e. allow either incoming media stream, such as audio or video to be blocked and then unblocked by the receiver. This provides an advantage that, for example, in a conference call a participant who does not realize that he/she is disturbing others, or whose radio, for example, is turned on and makes circulating sound to other participants, can be blocked by the one who is disturbed. In a still another example, the button functionality may be provided also media type-specifically, for example by means of a button to close all audio output regardless of the source, or a button to dose all microphones in the sending apparatus or those connected (via wired or wireless connection) to the sending apparatus.

Further, it should be appreciated that it is possible to provide a user with two or more options for curtain functionality, for example by means of widgets and corresponding icons on a touch screen. An example includes one option for blocking/unblocking both incoming media streams and outgoing media streams and the other option for blocking/unblocking only the outgoing media streams. Another example includes one option for blocking/unblocking both incoming media streams and outgoing media streams and the other option for blocking/unblocking only the incoming media streams. Still a further example includes one option for blocking/unblocking incoming media streams and the other option for blocking/unblocking only the outgoing media streams. It is also possible to have three options, for example, one option for blocking/unblocking both incoming media streams and outgoing media streams, one option for blocking/unblocking only the outgoing media streams and one option for blocking/unblocking only the incoming media streams.

FIG. 4D illustrates an additional curtain functionality that may be implemented with any other curtain functionality. In the example it is assumed that there are both a common curtain and one or more contact-specific curtains.

Referring to FIG. 4D, when a change in curtain status is detected (step 401), it is checked in step 402 whether or not the curtain was dosed before the change.

If the curtain was not dosed before the change, the change is that the curtain is dosed. Therefore in step 412 it is checked, whether or not the dosed curtain is a common curtain, if it is, all different user data related input/output interfaces or corresponding devices, integrated or external, such as a camera, a microphone, audio DSP (digital signal processing) card, etc. are switched off in step 413 to save power as long as no change is detected (step 401). However, the interfaces and other devices/cards for exchanging signaling information are not switched off so that the connection is maintained.

If the dosed curtain was not a common curtain (step 412) it is checked in step 414, whether or not all contact-specific curtains are dosed. If yes, than the process proceeds to step 413 to switch off the devices, if all contact-specific curtains are not dosed (step 414), i.e. at least one is open, the process proceeds to step 401 to monitor whether a change in a curtain status is detected.

If the curtain was dosed before the change (step 402), the curtain is opened. Therefore it is checked in step 415, whether or not the different user data related input/output interfaces or corresponding devices are switched off. If yes, they are switched on in step 416, and the process proceeds to step 401 to monitor whether a change in a curtain status is detected.

If the devices are not switched off (step 415), they are already switched on, and the process proceeds to step 401 to monitor whether a change in a curtain status is detected.

An advantage of switching off devices whenever it is possible is that it enables to save power, and hence provides an ecological solution.

In the example of FIG. 4D it is assumed that there are two types of media streams, video and audio, and the blocking is performed partially to a video stream and wholly to an audio stream, without restricting the implementations to such a solution. For example, the audio stream may be hummed while the video stream is blocked totally. In another example, a data stream may be blocked wholly while the audio stream and video stream are blocked partially.

Referring to FIG. 40, when a change in curtain status is detected (step 401), it is checked in step 402 whether or not the curtain was closed be-fore the change. If yes, the curtain is opened, and all incoming media is outputted in step 403 via corresponding interfaces, like the screen and loudspeakers, and all media received via different user interfaces or in response to a user input (like sharing a document) is sent in step 403 towards the one or more other participants of the communication as long as no change is detected (step 401).

If the curtain was not closed (step 402) before the change, the curtain is is closed and audio media received via one or more user interfaces or in response to a user input is not sent in step 417 towards the one or more other participants of the communication but discarded, whereas video media received via one or more user interfaces is blurred in step 417. The video media stream may be blurred by decreasing a bit rate of the stream or by a lossy compression or by leaving out one or more channels, such as color channels (color difference channels) and/or luminance channel, or by sepia toning one or more of the color channels (color difference channels) or by adding noise to the video stream, for example.

All incoming audio media is discarded in step 418 instead of outputting it to the user as long as no change is detected (step 401). Further, all incoming video is blurred in step 418 as long as no change is detected (step 401), In the example of FIG. 4F the blocking is stepless. In the example it is assumed that there is an adjustment area within a knob that may be moved so that the incoming and/or outgoing media streams are either wholly blocked, partially blocked, or unblocked depending where in the adjustment area (opening/closing area) the knob locates.

Referring to FIG. 4F, when a change in curtain status, i.e. a movement of the knob, is detected (step 401') the direction whereto the knob was moved, and the amount of movement (i.e. distance from starting the starting point) is determined in step 419, and the disturbing of the incoming media streams and/or outgoing media streams are adjusted in step 420 correspondingly. For example, if the knob was in the middle of the area and it was moved to the end opening the curtain, the media streams are not disturbed, whereas if the knob was moved to the other end, the media streams are wholly blocked.

As is evident from the above, the connection is ready to transmit and receive all the time but blocking sending two or more media streams and/or receiv ing one or more media streams, and unblocking correspondingly, takes place in response to a simple single action of the user.

However, in one embodiment the curtain may be locked in the open position and/or (in) the closed position, so that for closing an open curtain or opening a locked curtain a password or a biometric identification is needed. The password may be inputted by using a separate keyboard or a virtual keyboard. It should be appreciated that there are no restrictions to what constitutes a password. The password may comprise several different parts, for example to be a simultaneously performed waiving of a hand in a specific way and saying a specific word.

Figure 5:
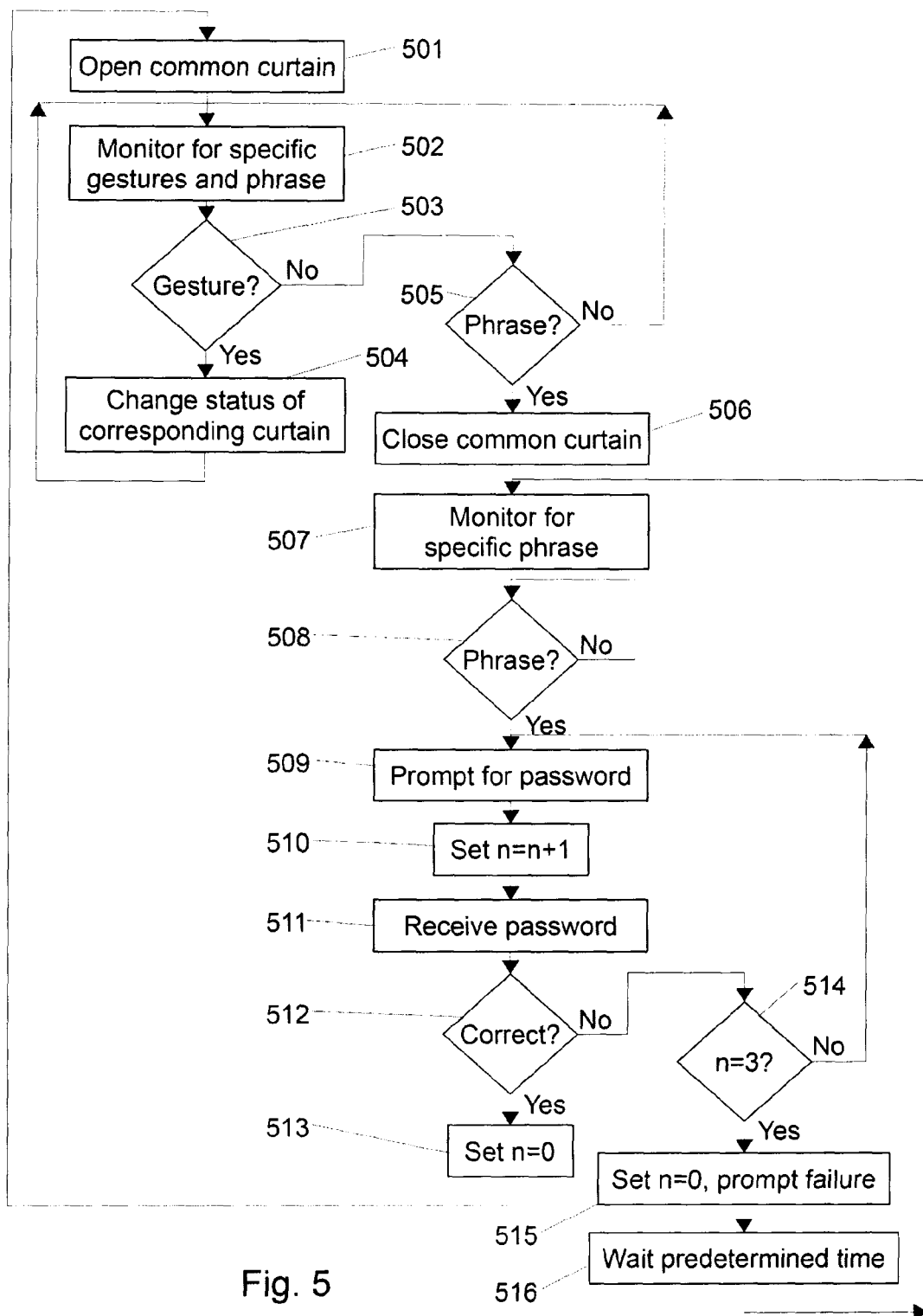

In the example of FIG. 5, a gesture is used for closing and opening a contact-specific curtain, the common curtain being closable by a specific phrase and operable by a combination of a specific phrase and a password inputted by a virtual keyboard.

Referring to FIG. 5, when the common curtain is opened in step 501, the input of the user via the different user interfaces is monitored in step 502 to detect a specific gesture or a phrase.

If a specific gesture, such as a number indicating a contact/ participant, defined to relate to closing or opening a contact-specific curtain is detected (step 503), the status of a corresponding contact-specific curtain is changed in step 504. In other words, a closed contact-specific curtain is opened, and vice versa. Then the process continues the monitoring in step 502.

If a specific phrase, such as "close the curtain", defined for closing the common curtain, is detected (step 505), the common curtain is closed in step 506, and the input of the user via the different user interfaces is monitored in step 507 to detect a specific phrase defined for opening the common curtain.

When the specific phrase, such as "open the curtain", is detected (step 508), the user is prompted in step 509 to input a password for opening the curtain and a value "n" for calculating attempts to provide a proper password is increased by one in step 510. In the illustrated example it is assumed that three successive attempts are allowable, and then the user has to wait for some time to try once again. When the password is received (step 511), it is checked in step 512, whether or not it is a correct one. If the received password is a correct one, the value "n" is set to zero in step 513, and the process proceeds to step 501 to open the common curtain.

If the received password was not a correct one (step 512), it is checked in step 514, whether or not the value "n" equals to three. If not, the process proceeds to step 509 to prompt the user to input the password. If the value "n" equals to zero (step 515), the value of "n" is set to zero in step 515, and the user is prompted in step 515 for the failure, i.e. that all attempts to input the password have been used and the user has to wait before he/she can try again.

Then the process waits in step 516 for a predetermined time, such as 5 minutes or 15 minutes or 1 hour, before it starts to monitor in step 507 the specific phrase.

Figure 6:
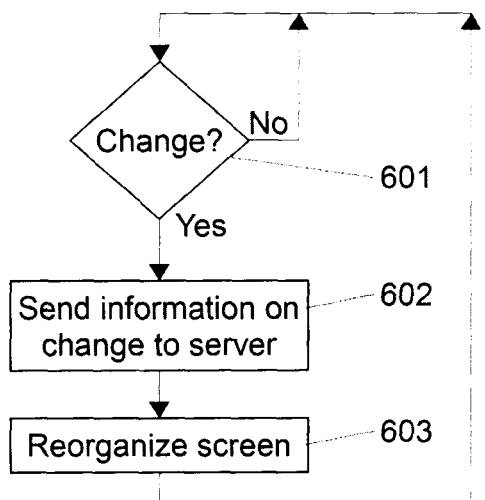

FIG. 6 illustrates another exemplary functionality of the user apparatus. More precisely, FIG. 6 illustrates another exemplary functionality of the curtain unit.

Referring to FIG. 6, when a change in the curtain status is detected in step 601, information indicating the change is sent to the server in step 602. Depending on an implementation, the information may indicate a closing or an opening of the curtain, or be a mere indication of the change. Further, in the example the curtain unit is further configured to reorganize (in step 603) the one or more screens the user is having to correspond to the change. The reorganization covers here changing places and/or sizes and/or visibility and/or appearance of one or more item, an item including a screen part used for outputting video information, or corresponding information, from another participant. One or more of the items may overlap with one or more another item before or after the reorganization. An example of reorganization is illustrated in FIGS. 2D and 2E. Another example is that if the opening area 201B in FIG. 2F is touched, the part 210 allocated for Anssi in FIG. 2F is decreased, and the result may be that each active participant, i.e. Anssi, Tera, Mark and Tiina has parts of equal size The procedures described with FIGS. 3A to 4F and 6 may be also performed contact-specifically. Further, a common curtain may be configured to perform a different procedure than a contact-specific curtain. For example, a dosed common curtain may cause all incoming media streams not to be outputted to a user, whereas a dosed contact-specific curtain may cause all incoming media streams from the contact to be shown as disturbed (blurred/hummed).

In the example illustrated above, it is assumed that a media stream may be disturbed by one, specific way. However, that needs not to be the case. The user interface of an apparatus may provide one or more selecting means providing different alternatives how to disturb a media stream, either having separate selecting means for each alternative, or by combining one or more alternatives. For example a button, that after a first click decreases the bit rate, after a second click leaves out one color channel (while maintains the decreased bit rate), after a third click further adds noise, etc. The video media stream may be blurred by decreasing a bit rate of the stream or by a lossy compression or by leaving out one or more channels, such as color channels (color difference channels) and/or luminance channel, or by sepia toning one or more of the color channels (color difference channels) or by adding noise to the video stream, for example. Further, there may be one or more additional selecting means setting a "disturbance alternative" either as an allowable alternative or non-allowable alternative. The selecting means may be provided for incoming media or for outgoing media or for both. In case the selecting means are for incoming media, they user apparatus may be configured to send information on the selected disturbance alternative towards the sending apparatus, and in response to receiving such information from another apparatus, to use the additional selecting means, for example, to set the alternative as an allowable one. Further, when a server apparatus performs the disturbing, it may be configured to inform user apparatuses on available "disturbance alternatives", and the user apparatus may be configured to use the information in the way described above, FIGS. 7 and 8 illustrate exemplary functionalities of the server apparatus during conferencing. More precisely, exemplary functionalities of a traffic handling unit configured to be a counter-party of the curtain unit in FIG. 6 is illustrated. However, in the example it is assumed that closing and opening may be performed contact-specifically. Further, it is assumed that the server is configured to store the content of the media stream for later playback. In the illustrated example it is assumed that the traffic handling unit is configured to maintain a list of participants of a communication and associated participant-specific information on contacts having a curtain closed by the participant in question by means of a participant-specific blocked participants list. However, it should be appreciated that any mechanism to track corresponding information may be used. It should be appreciated that if the communication is implemented by means of a room concept, such as a Star window room, to which participants may be defined beforehand, it depends on an implementation, whether the list of participants, comprise only active participants, or all participants sharing the room. If all participants are in the list of participants, it depends on an implementation, whether or not only active participants are taken into account, when information is added and/or deleted from a blocked participants list. Further, in the examples of FIGS. 7 and 8 it is assumed, for the sake of clarity, that a dosed curtain blocks the stream wholly.

Figure 7:
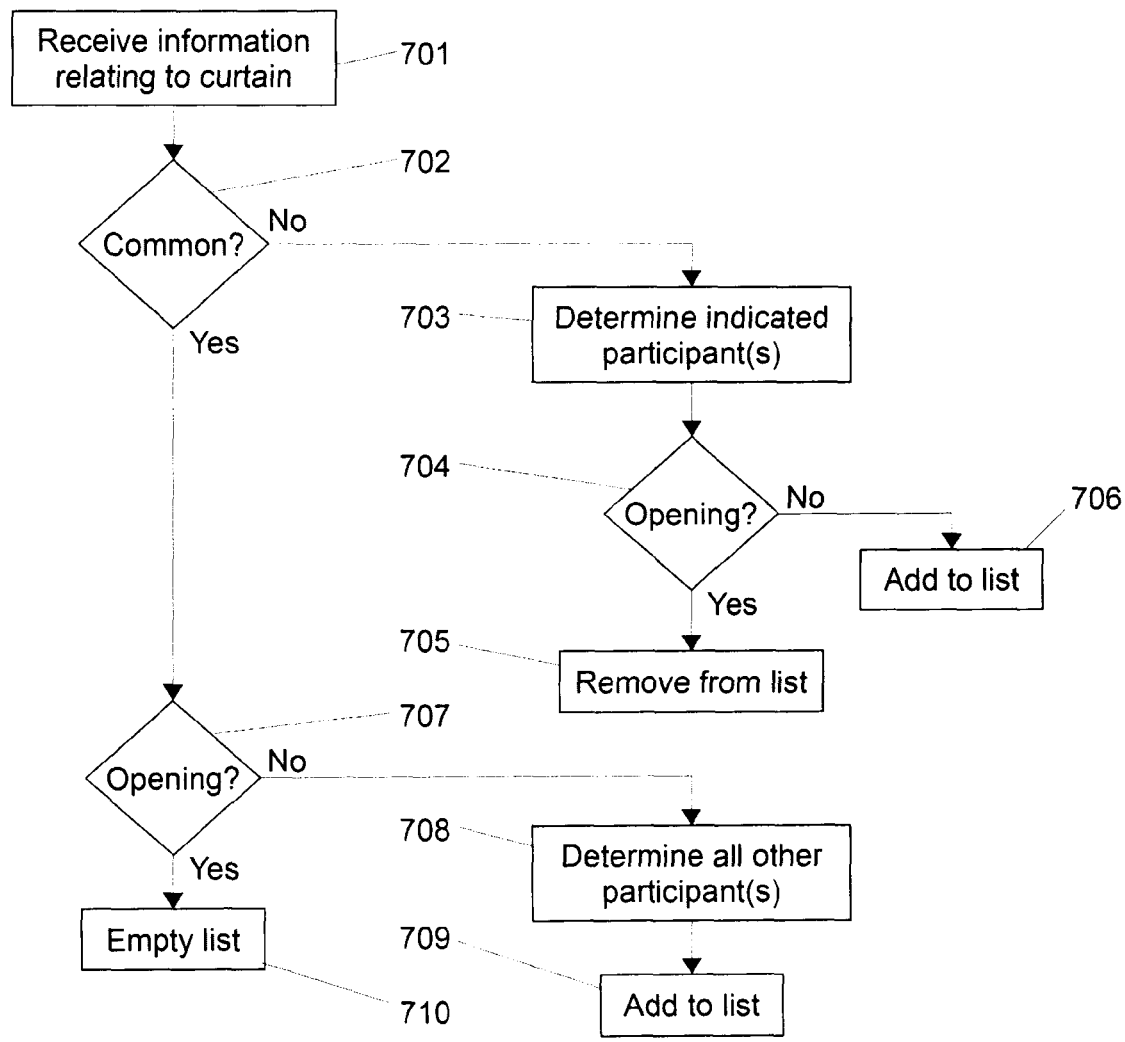

Referring to FIG. 7, when information relating to a curtain of a participant is received in step 701 from the participant, called below a sender, it is checked in step 702, whether or not the information relates to the common curtain. If the information does not relate to the common curtain, it relates to one or more contact-specific curtains, and one or more of the participants indicated in the received information are determined in step 703. Then it is checked, in step 704, whether or not the information indicates opening one or more curtains, if it relates to opening, the participants determined in step 703 are removed in step 705 from the sender's list of the blocked participants. If the information does not relate to opening (step 704), it relates to closing of a corresponding curtain, and the participants determined in step 703 are added in step 706 to the sender's list of the blocked participants.

If the information relates to the common curtain (step 702), it is checked, in step 707, whether or not the information indicates opening the common curtain. If it relates to opening, the sender's list of the blocked participants is emptied in step 710. If the information does not relate to opening (step 707), it relates to closing of the common curtain, and all other participants are determined in step 708 and added in step 709 to the sender's list of the blocked participants.

In implementations in which media streams may be blocked partly, when a participant is added to a list, information indicating the degree of blocking (wholly, partly, disturbed 80%, audio wholly and video 50% blurred, etc.) may be associated with the participant. In a case in which the user apparatus sends alternative media streams, like a blurred video and not blurred video, the server may be con figured to store the alternative media streams or only the not disturbed media stream, and information on how the alternative media streams where disturbed so that in a playback situation the server is able to playback properly but less information needs to be stored.

Figure 8:
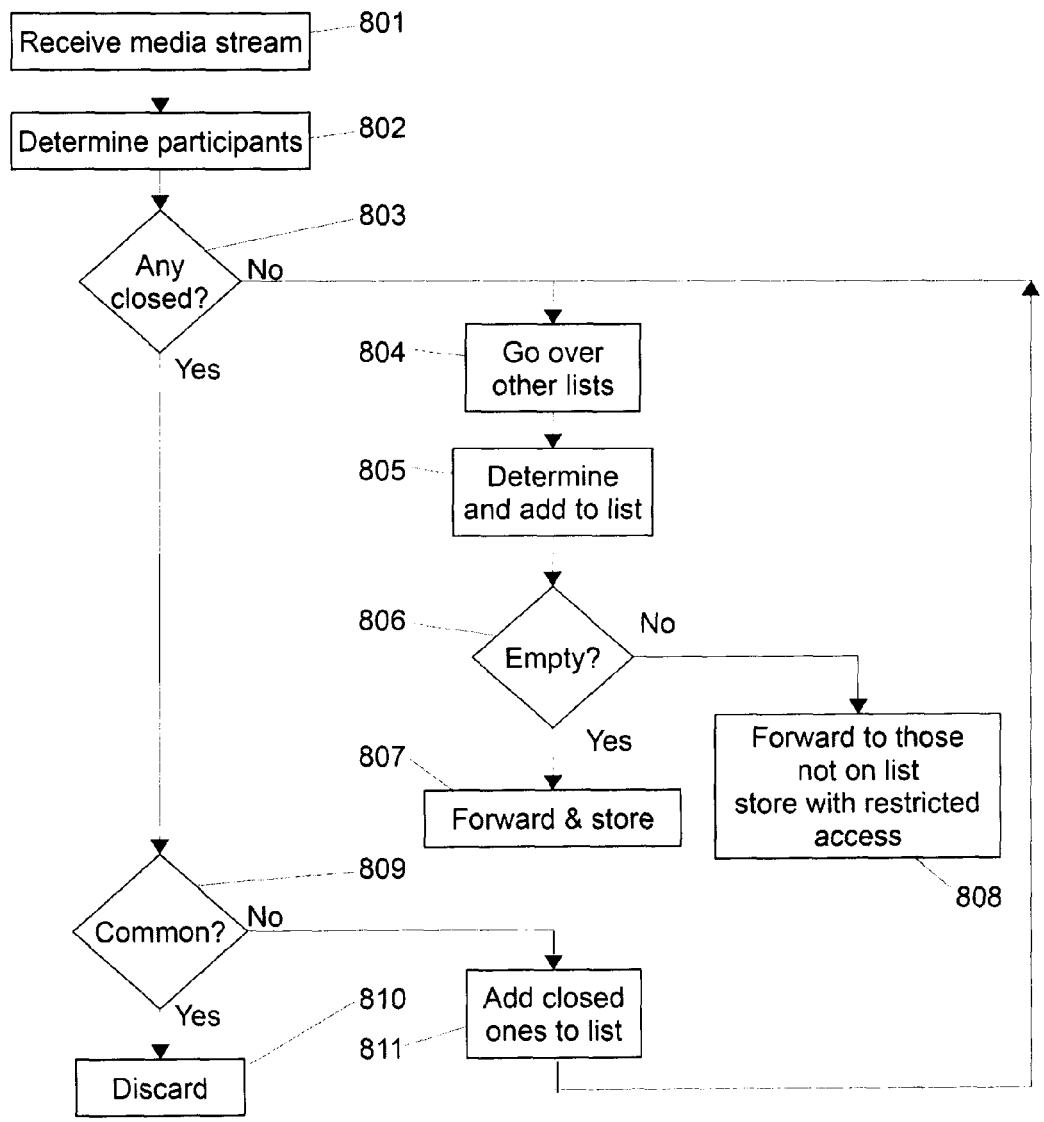

FIG. 8 illustrates an exemplary functionality how the traffic handling unit handles the media streams relating to the communication. In the illustrated ex ample it is assumed that the communication is in a room having predetermined participants, some of which may be inactive. An inactive participant may have his/her apparatus closed or may be involved in another communication, for ex ample. In the example, in addition to the participant-specific list of the blocked participants, a temporary list is maintained, the temporary list comprising the participants in the lists of the blocked participants, as well as those participants who are not in the sender's list of the blocked participants but on whose list of the blocked participants the sender is.

When a media stream, like voice or video or text, or a corresponding packet, is received in step 801, the active participants are determined in step 802. Then it is checked in step 803 whether or not the sender of the media stream has any participants in the list of the blocked participants. If not, then the lists of the blocked participants of other participants are gone over in step 804 to find out those participants who have closed the curtain for the sender. Each other participants on whose list of the blocked participants the sender is found is determined in step 605 and added to the temporary list. If none such other participants is found, i.e. the temporary list is empty (step 806), the media stream is forwarded to participants (except the sender) and stored in step 807. The media stream may be stored with information indicating active participants or the predetermined participants (active or inactive) so that participants added to the room afterwards will not have right to playback information exchange that has taken place before they become room members. However, storing the media stream with an empty temporary list, i.e. media without restricted access provides the possibility that later added participants may also view common history of a room.

If the temporary list is not empty (step 806), the media stream is forwarded in step 808 to all other active participants except to those in the temporary list and the media stream is stored in step 808 with restricted access information indicating directly or indirectly participants who are allowed or not allowed to retrieve the data stream afterwards, as will be described below.

If the sender of the media stream has one or more participants (step 803) in the list of the blocked participants, it is checked in step 809, whether or not all other participants are in the list of the blocked participants, i.e. whether the common curtain is closed. If yes, the media stream is discarded in step 810.

If the list of the blocked participants does not contain all other participants (step 809), the participants in the list of the blocked participants are added in step 811 to the temporary list and the process continues to step 604 to go over the lists of the blocked participants of the other participants.

Depending on an implementation, the restricted access information may indicate participants having access to the stored media stream, or participants not having access to the stored media stream. The participants indicated as having restricted access may be all other room members, i.e. the defined participants in the room during the information exchange, except the participants who are in the blocked participants list of the sender. With the implementation participants added to the room afterwards will not have right to playback the media stream but those who have been absent are allowed to later see what has been discussed. Alternatively, the participants having restricted access may indicate all other active participants except the participants who are in the blocked participants list of the sender. If the restricted access is indicated by indicating the participants who are not allowed to playback the media stream, the indicated ones may be the ones in the blocked participants list of the sender. In an implementation, also those participants who have blocked the sender, will not be allowed to playback the media stream, and then also those are indicated either directly or indirectly in the restricted access information. The restricted access information ensures that those to whom the media stream was not intended are not able to playback it either.

If a closed curtain does not block a media stream wholly, the media stream is forwarded as a disturbed one to the participants in the temporary list in step 808. Depending on an implementation, if different degrees of disturbance (blocking) are supported, the media streams are disturbed accordingly participant-specifically. Further the restricted access information may comprise information on the degree of disturbance. Further, in step 810 instead of discarding, the media stream is sent as disturbed one, and preferably the disturbed media stream is stored. Alternatively, the media stream is stored with restricted access information.

In a further example, based on a combination of FIG. 4A, 4B or 4C and 6 in the user apparatus, when a change is detected, blocking/unblocking of the sending from the user apparatus is performed by the user apparatus but the user apparatus further sends information of the change to the server so that the server blocks data streams to the user apparatus. Alternatively, the server may be configured to detect that no user data is received from the user apparatus, and to interpret it to correspond a closing of a common curtain, and therefore blocks data streams to the user apparatus, and when user data is again received from the user apparatus, the server apparatus interprets this as an opening of the common curtain. The solutions have the advantage that network resources to and from the user apparatus that has a closed curtain (i.e. blocked services) are not used in vain for transmitting information that will be discarded.

Figure 9:
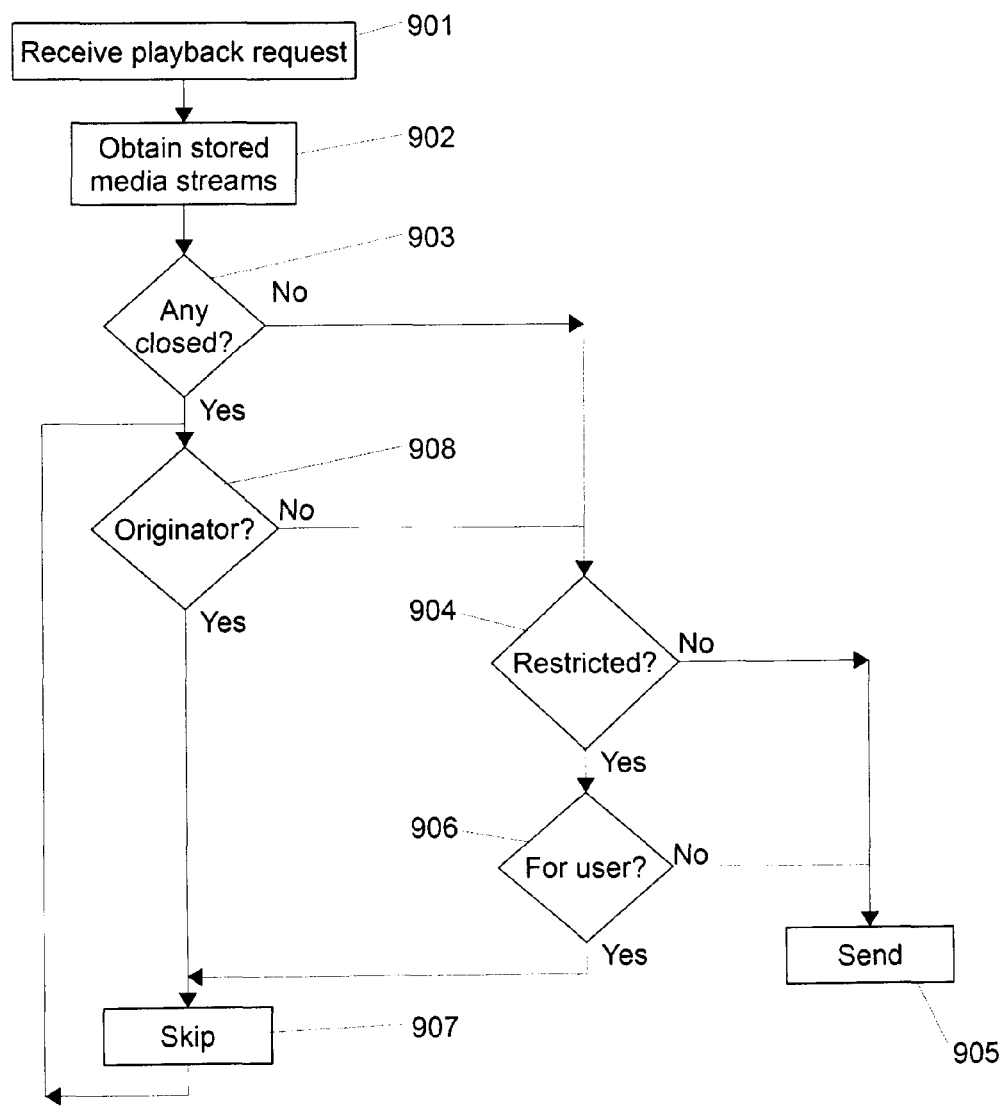

FIG. 9 illustrates an exemplary functionality of the server, or more precisely of a traffic handling unit configured to support playback of recordings, i.e. different media streams stored for a room. In the illustrated example it is assumed that even during a playback the user may close a curtain, and for that purpose a list for the blocked participants for playback is maintained temporarily using the same principles that are illustrated above with FIG. 7. Further, it is assumed, for the sake of clarity, that the one requesting the playback is a member of the room.

Referring to FIG. 9, when a playback request indicating a specific recording, or a specific point in a recording, like a product development meeting held at a certain day, or even a specific moment of the meeting, is received in step 901 from a requester, the stored media streams are obtained/retrieved in step 902, starting from the indicated point.

Then the media streams are processed originator-specifically in parallel so that media streams received in the server, and stored having the same time information, are outputted (if the requester has right to see and hear the media stream) simultaneously to reflect the actual situation. However, for the sake of clarity, processing of one media stream is described below.

First it is checked, in step 903, whether or not the requester has closed one or more curtains. If no curtains are closed, it is checked in step 904, whether or not the media stream has restricted access. If not, the media stream is sent in step 905 to the requester so that it will be outputted to him/her.

If the media stream has restricted access (step 904), it is checked in step 906, whether or not the restricted access indicates that the access is restricted/denied/blocked for the requester (user). If not, i.e. the requester is allowed to see and hear the media stream, the process proceeds to step 905 to send the media stream. If the media stream is blocked for the requester (step 906), the media stream is skipped over in step 907

If a curtain relating to the originator, i.e. source of the media stream, is closed for the playback (step 908), the process proceeds to step 907 to skip over the media stream.

In another example, instead of skipping over in step 907, the media stream may be sent as blurred/hummed or otherwise disturbed.

The processing described in step 903 to 908 are repeated for media streams the whole time as long as the playback continues (i.e. is not ended or paused). Further, it should be appreciated that during playback the user may rewind or forward, and the media streams are processed then from the point in time in which the rewind or forward stopped.

Figure 10:
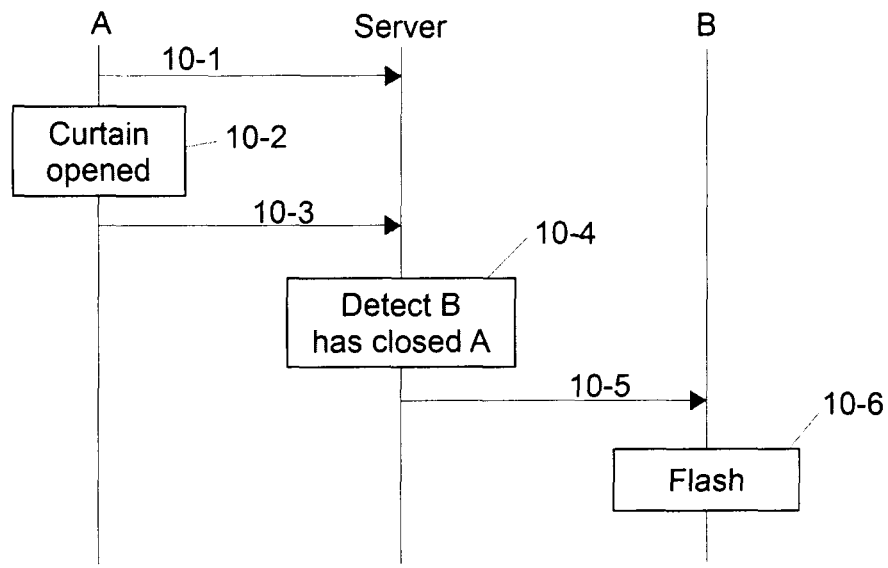
FIGS. 10, 11 and 12 illustrate exemplary information exchange and functionalities.

FIG. 10 illustrates an exemplary information exchange and functionality in which, when a participant opens a curtain, either common or contact-specific, information is sent to other participants who have closed a curtain for the participant. Further, in the example it is assumed that a curtain unit in a user apparatus is configured to block sending media streams in response to a curtain being closed, without restricting the example to such a curtain unit.

Referring to FIG. 10, a participant A has closed a common curtain, and the curtain unit sends signaling data 10-1 to the server apparatus in order to maintain the connection. Then the participant A opens the common curtain, and the curtain unit detects opening of the curtain point 10-2. The curtain unit informs the server correspondingly by sending in message 10-3 information on the change.

In response to receiving message 10-3, the traffic handling unit, in addition to what is disclosed above, goes over the blocked participants lists of other participants to find out, whether or not one or more other participants have closed a curtain for the participant A. In the illustrated example, it is detected that a participant B has closed in his/her end a curtain for the participant A. Therefore the server informs the participant as user apparatus that the participant A has opened the curtain by sending message 10-5. The message may be a specific message for the purpose, or the information may be piggybacked to another message.

The curtain unit in the user apparatus of the participant B is configured to react to the information received in message 10-5 by flashing, in point 10-6, for a predetermined period, participant A's name, for example. Other means to alert the participant B may be used as well, for example means that are familiar from smart phones. When the participant B is aware that the participant A has opened the curtain, the participant B may in turn open his/her curtain (either common or contact-specific) for the participant A.

Figure 11:
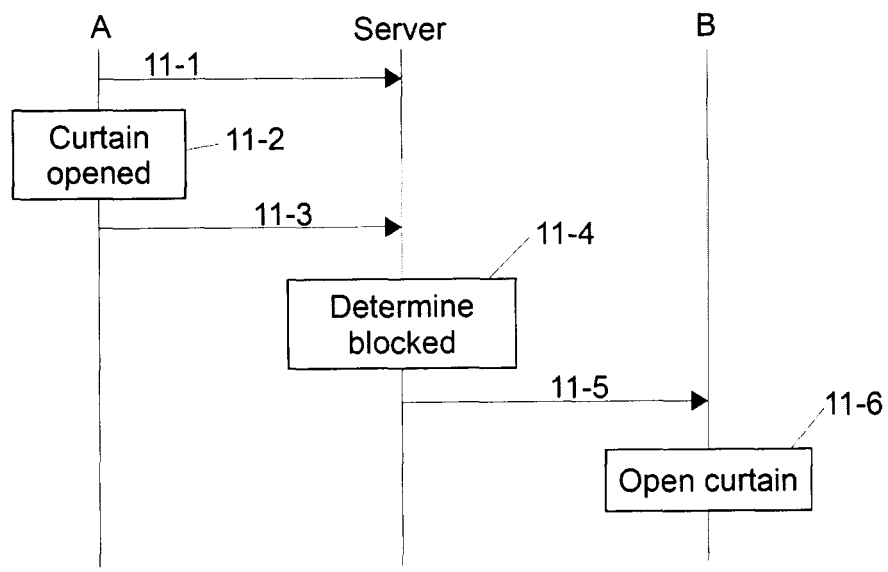

FIG. 11 illustrates an exemplary information exchange and functionality in which a closed curtain may be opened by any participant blocked by the curtain. For example, a parent is able to view what happens in home whenever a need arises. An example of such a need is when a teenager stays at home over a weekend while parents are in their summer cottage, and the teenager is forbidden to have a party at home. Further, in the example it is assumed that a curtain unit in a user apparatus is configured to block sending media streams in response to a curtain being closed, without restricting the example to such a curtain unit. Further, below it is assumed, for the sake of clarity, that only two participants are active.

Referring to FIG. 11, media streams between a participant A and a participant B are blocked by means of a curtain. In the example, it is assumed that the participant A has closed a common curtain which caused closing of a contact-specific curtain in the participant B's user apparatus. The curtain unit in the participant A's user apparatus sends signaling data 11-1 to the server apparatus in order to maintain the connection. Then the participant A opens the common curtain, and the curtain unit detects opening of the curtain point 11-2. The curtain unit informs the server correspondingly by sending in message 11-3 information on the change.

In response to receiving message 11-3, the traffic handling unit, in addition to what is disclosed above, goes over the blocked participants lists of other participants, and the blocked participants list of the participant A to determine in point 11-4 one or more other participants who have closed a curtain for the participant A, or who are blocked by the participant A. In the illustrated example, it is detected that the participant A has blocked the participant B. Therefore the server informs the participant B's user apparatus that the participant A has opened the curtain by sending message 11-5. The message may be a specific message for the purpose, or the information may be piggybacked to another message.

The curtain unit in the user apparatus of the participant B is configured to react to the information received in message 11-5 by opening the contact-specific curtain for the participant A in the user apparatus of the participant B.

It should be appreciated that if the participant B had opened the contact-specific curtain, the result would have been that the common curtain in the user apparatus of the participant A would have been opened.

In another implementation the above described opening and closing is limited to contact-specific curtains.

Figure 12:
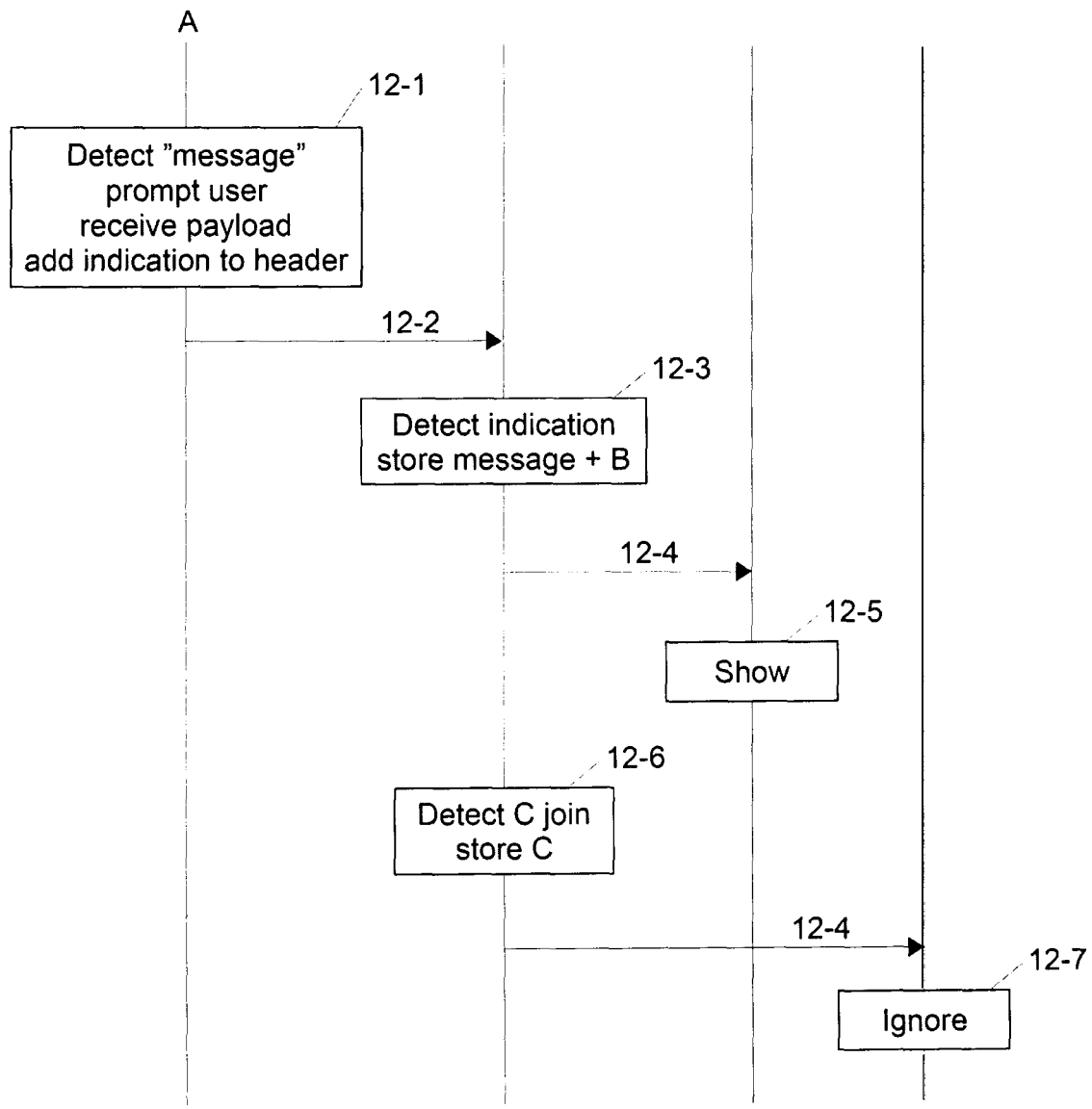

FIG. 12 illustrates an exemplary implementation in which the curtain unit is configured to allow sending curtain-related messages when the curtain is closed. For example, a closed curtain may contain specific buttons for different messages, such as "a text message", "a video message", and "an audio message". Further, in the illustrated example it is assumed that the curtain unit is configured to provide the user a selection whether to input a new message or send a previously stored message, and that the settings of the apparatus either allow outputting or not allow outputting such a message, the settings being set by the user, a default setting being "allow".

Referring to the example of FIG. 12, a participant A has closed a common curtain and wants to inform other participants for the reason of closing, for example. The curtain unit in the user apparatus of the participant A has detected in point 12-1, that the user has selected an option "text message", and therefore the curtain unit prompts in point 12-1 the user to select whether a new message is to be inputted or one of previously stored messages is to be sent. In the illustrated example, the user selects to input a new message, and inputs the content of the message. In other words, the user apparatus receives in point 12-1 the payload of the message. The payload may be "In urgent matter, please call to a number +358501234567", for example. The curtain unit then adds in point 12-1 to the message, preferably in a header, an indication that the message is additional information to a closed curtain. The text message with the indication is then sent to the server apparatus in message 12-2. A similar indication is added to each curtain-related message regardless of its type, such as a video clip, such as a video taken in a shop, or airport and the user saying that I am now shopping/going to flight", or a corresponding voice message, for example In response to receiving message 12-2, the traffic handling unit, in addition to what is disclosed above, detects in point 12-3 the indication, and therefore forwards the message to one or more other active participants who are blocked by curtain closed by the participant A. In the illustrated example, the participant B is the only one active, and hence the only one that has been blocked. Therefore the server sends message 12-4 that comprises the indication and text message to the participant B's user apparatus. Further, in point 12-3 the server stores message 12-2 and information on that the message has been sent to the participant B. In the example, the information is maintained as long as the participant A's curtain is closed. By means of the information it is ensured that each participant receives the message once, and each participant joining the communication while the curtain is closed, receives the message. Depending on an implementation, the message may be stored as part of the conversation so that it will be outputted during playback or it will not be shown during playback, when the playback feature is implemented. It should be appreciated that in a further exemplary implementation the message is forwarded only to participants that are active at the time the message was created.

The curtain unit in the user apparatus of the participant B is configured to react, in response to the indication, to the associated message received in message 12-4 by showing in point 12-5 the associated message, or link to the associated message, in the corresponding curtain area to the participant B.

In the illustrated example, the server apparatus detects in point 12-6, that a participant C has joined the conversation, the participant C's new status is active and that the participant A's common curtain is closed but there is a curtain-related message that has not been forwarded to the participant C. Therefore the server apparatus sends message 12-4 to the participant C, and stores information that the message has been sent to the participant C. However, in the illustrated example, the curtain unit in the user apparatus of the participant C is configured to reject curtain-related messages and therefore message 12-4 is ignored in point 12-7, it should be appreciated that if a curtain to which a message is added, is a participant-specific curtain, the message is preferably forwarded only to the participant whose curtain is closed, or if there are two or more participant-specific curtains closed, the user may select one or more closed participant-specific curtains to which the same message is sent.

An apparatus configured to provide the user apparatus, and/or an apparatus configured to provide the server apparatus, and/or any corresponding apparatus configured to provide one or more corresponding functionalities, is a computing device that may be any apparatus or device or equipment or network node or network entity configured to perform one or more of corresponding apparatus functionalities described with an embodiment/example/implementation, and it may be configured to perform functionalities from different embodiments/examples/implementations. The unit(s) described with an apparatus may be separate units, even located in another physical apparatus, the physical apparatuses forming one logical apparatus providing the functionality, or integrated to another unit in the same apparatus. In other embodiments, a unit in an apparatus, or part of the unit's functionality, may be located in another physical apparatus.

More precisely, the units and entities (illustrated in FIGS. 1A and 1B) may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding apparatus/entity described with an embodiment/example/implementation comprises not only prior art means, but also means for implementing the one or more functions of a corresponding apparatus described with an embodiment/example/implementation and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus configured to provide the user apparatus, and/or an apparatus configured to provide the server apparatus, and/or any corresponding apparatus configured to provide one or more corresponding functionalities, may generally include a processor, controller, control unit, microcontroller, or the like connected to a memory and to various interfaces of the apparatus. Generally the processor is a central processing unit, but the processor may be an additional operation processor. Each or some or one of the units/entities described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/entities described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, each or some or one of the units/entities described above may be an element that comprises one or more arithmetic logic units, a number of special registers and control circuits.

Further, an apparatus configured to provide the user apparatus, and/or an apparatus configured to provide the server apparatus, and/or any corresponding apparatus configured to provide one or more corresponding functionalities, may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories, especially when storing of media stream content is provided, may be of any type (different from each other), have any possible storage structure and, if required, being managed by any database/cache management system. The memory may also store computer program code such as software applications (for example, for one or more of the units/entities) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus, a distributed database and a cloud server.

The steps/points, messages and related functions described above in FIG. 3A to 12 are in no absolute chronological order, and some of the steps/points may be performed simultaneously or in an order differing from the given one. Other functions can also be executed between the steps/points or within the steps/points. Some of the steps/points or part of the steps/points can also be left out or replaced by a corresponding step/point or part of the step/point. The messages are only exemplary and may even comprise several separate messages for transmitting the same information.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
   receiving in a single input, a request to block two or more media streams of different media types relating to a singular conference communication having three or more participants, the request originating from a first participant in the conference communication and indicating a second participant in the conference communication; and
   in response to receipt of the request, at least partly blocking outputting of the two or more media streams in an apparatus of the first participant when the two or more media streams originate from the second participant while continuing outputting the two or more media streams originating from other participants in the conference communication, and at least partly blocking transmission of the two or more media streams from the first participant to the second participant while continuing transmission of the two or more media streams from the first participant to the other participants in the conference communication.

2. The method as recited in claim 1, further comprising performing unblocking of the blocked two or more media streams in response to receiving corresponding information indicating unblocking.

3. The method as recited in claim 2, wherein the unblocking is performed in response to receiving the corresponding information from the apparatus.

4. The method as recited in claim 2, further comprising performing the unblocking or blocking in response to receiving the corresponding information from an authorized source.

5. The method as recited in claim 1, wherein the blocking is performed in response to receiving the request from the apparatus.

6. The method as recited in claim 1, further comprising blocking the two or more media streams and/or unblocking the blocked two or more media streams at a predetermined times or in response to a predetermined time period being lapsed.

7. The method as recited in claim 1, further comprising:
receiving the request to block the two or more media streams or to unblock the blocked two or more media streams relating to the communication via a user interface of the apparatus of the first participant; and
sending information on the second participant and the blocking or unblocking of the two or more media streams from the apparatus towards a server providing the communication service.

8. The method as recited in claim 7, further comprising performing the blocking or unblocking in the server.

9. The method as recited in claim 7, wherein the information is received at least via one of a touch screen, a motion detection device, a camera, a microphone, an intelligent floor, a voice detection device, a light detection device, a touch detection device, a smell detection device, an odour detection device, a heat detection device, a switch, a keyboard, a virtual keyboard, a mouse, a joystick, a selector roller, a choice wheeler, a selector switch, a drawing pad and a touch pad.

10. The method as recited in claim 7, further comprising:
storing the blocked media streams with access information indicating directly or indirectly one or more user not allowed to playback the media stream.

11. The method as recited in claim 10, further comprising:
receiving a playback request, the request indicating a user requesting the playback; and
playbacking the media streams if the user is allowed to playback.

12. The method as recited in claim 1, wherein the single input is a combination of a user input indicating to block or unblock, and a password.

13. The method as recited in claim 1, wherein the information is received at least via one of a touch screen, a motion detection device, a camera, a microphone, an intelligent floor, a voice detection device, a light detection device, a touch detection device, a smell detection device, an odour detection device, a heat detection device, a switch, a keyboard, a virtual keyboard, a mouse, a joystick, a selector roller, a choice wheeler, a selector switch, a drawing pad and a touch pad.

14. The method as recited in claim 1, wherein the blocking is performed by not outputting or forwarding the received two or more media streams, or by outputting or forwarding the received two or more media streams as disturbed media streams, or by outputting or forwarding at least one of the received two or more media streams as a disturbed media stream and not outputting or forwarding remaining media streams, or by not sending the two or more media streams, or by sending the two or more media streams as disturbed media streams, or by sending at least one of the two or more media streams as a disturbed media stream and not sending remaining media streams.

15. An apparatus comprising means for implementing a method according to claim 1.

16. The apparatus as recited in claim 15, further comprising at least one processor; and one memory including computer program code, wherein the at least one memory and the computer program code are configured to, with the at least one processor, provide the means for implementing a method according to claim 1.

17. A non-transitory computer readable memory storing a computer program product executable by a processor and comprising program instructions which, when executed by the processor, cause the processor to perform the method according to claim 1.

18. The method as recited in claim 1, further comprising, when media streams between the first participant and the second participant are blocked in response to the request originating from the first participant, outputting in the second participant's apparatus and/or in other participants' apparatuses a message generated by the first participant.

19. A method comprising:
receiving in a single input, information indicating that two or more media streams of different media types relating to a communication are to be blocked in an apparatus; and
in response to the received information, outputting or forwarding the two or more media streams as disturbed media streams, or outputting or forwarding at least one of the two or more media streams as a disturbed media stream and not outputting or forwarding remaining media streams, or by sending the two or more media streams as disturbed media streams, or by sending at least one of the two or more media streams as a disturbed media stream and not sending remaining media streams.

20. The method as recited in claim 19, further comprising, when media streams from the apparatus are blocked, outputting in other participants apparatuses a message generated by the user of the apparatus whose media streams are blocked.

21. A system comprising a server apparatus configured to provide communication services and comprising means for implementing a method according to claim 19 and two or more user apparatuses configured to be in communication with each other via the server apparatus.

* * * * *